US 011528417B2

United States Patent
Riauté et al.

(10) Patent No.: US 11,528,417 B2
(45) Date of Patent: Dec. 13, 2022

(54) CALIBRATING AN IMAGE CAPTURE DEVICE WITH A DETACHABLE LENS

(71) Applicant: GoPro, Inc., San Mateo, CA (US)

(72) Inventors: Vincent Riauté, Carrières sous Poissy (FR); Sandra Vitorino, Antony (FR); Balthazar Neveu, Issy les Moulineaux (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/404,950

(22) Filed: Aug. 17, 2021

(65) Prior Publication Data
US 2022/0070374 A1 Mar. 3, 2022

Related U.S. Application Data

(60) Provisional application No. 63/072,508, filed on Aug. 31, 2020.

(51) Int. Cl.
*H04N 5/228* (2006.01)
*H04N 5/232* (2006.01)
(Continued)

(52) U.S. Cl.
CPC ............ *H04N 5/23248* (2013.01); *G02B 3/06* (2013.01); *G02B 27/646* (2013.01); *G03B 17/14* (2013.01)

(58) Field of Classification Search
CPC ............. H04N 5/23248; H04N 5/2252; H04N 5/23267; H04N 5/23209; G02B 3/06;
(Continued)

(56) References Cited

U.S. PATENT DOCUMENTS 2,186,610 A 1/1940 Leavitt
3,133,140 A 5/1964 Winchell
(Continued)

FOREIGN PATENT DOCUMENTS

EP 1619882 A2 1/2006
WO 2020055511 A1 3/2020

OTHER PUBLICATIONS

Geometric Image Transformations, https://docs.opencv.org/2.4/modules/imgproc/doc/geometric_transformations.html?highlight=resize#cv2.resize, OpenCV2.4.13.7, retrieved on Aug. 4, 2020, 11 pages.
(Continued)

*Primary Examiner* — Usman A Khan
(74) *Attorney, Agent, or Firm* — Young Basile Hanlon & MacFarlane, P.C.

(57) ABSTRACT

In a method, it is determined that a detachable lens is mounted on an image capture device in a first orientation. A first image of a controlled scene is captured with the detachable lens mounted in the first orientation. It is determined that the detachable lens is mounted on the image capture device in a second orientation that is rotated approximately 180 degrees from the first orientation. A second image of the controlled scene is captured with the detachable lens in the second orientation. A first image circle center of the first image is determined. A second image circle center of the second image is determined. An average image circle center is determined, based on the first image circle center and the second image circle center. The average image circle center is provided to an image stabilization algorithm when the detachable lens is mounted on the image capture device.

20 Claims, 7 Drawing Sheets

(51) Int. Cl.
*G02B 3/06* (2006.01)
*G02B 27/64* (2006.01)
*G03B 17/14* (2021.01)

(58) Field of Classification Search
CPC ........ G02B 27/646; G02B 7/14; G02B 27/32; G02B 27/62; G03B 17/14; G03B 17/08
USPC .................................................. 348/208.99
See application file for complete search history.

(56) References Cited

U.S. PATENT DOCUMENTS

| | | | |
|---|---|---|---|
| 4,451,130 A | 5/1984 | Yan | |
| 5,077,567 A | 12/1991 | Haraguchi | |
| 5,828,406 A | 10/1998 | Parulski | |
| 6,079,883 A | 6/2000 | Mori | |
| 7,161,749 B2 | 1/2007 | Sakurai | |
| 7,717,630 B1 | 5/2010 | Wan | |
| 8,294,988 B2 | 10/2012 | Cook | |
| 9,743,001 B1 | 8/2017 | Stec | |
| 9,995,990 B2 | 6/2018 | Lim | |
| 10,401,705 B2 | 9/2019 | Lim | |
| 10,701,249 B1 | 6/2020 | Guo | |
| 10,845,675 B2 | 11/2020 | Lim | |
| 2001/0012059 A1* | 8/2001 | Kudo | G02B 27/646 |
| | | | 348/208.99 |
| 2004/0240870 A1 | 12/2004 | Stiehler | |
| 2005/0168586 A1* | 8/2005 | Tsubusaki | H04N 5/23287 |
| | | | 348/208.99 |
| 2006/0007551 A1 | 1/2006 | Sakurai | |
| 2008/0094708 A1 | 4/2008 | Huang | |
| 2009/0002823 A1 | 1/2009 | Law | |
| 2009/0091827 A1 | 4/2009 | Gauger | |
| 2010/0149408 A1 | 6/2010 | Ito | |
| 2010/0302638 A1 | 12/2010 | Cuadra | |
| 2013/0028590 A1 | 1/2013 | Hasuda | |
| 2013/0071101 A1 | 3/2013 | Idera | |
| 2013/0129338 A1 | 5/2013 | Dowell | |
| 2014/0043733 A1 | 2/2014 | Huang | |
| 2015/0093104 A1 | 4/2015 | Clyne | |
| 2016/0066459 A1 | 3/2016 | Rayner | |
| 2016/0181722 A1 | 6/2016 | Tsai | |
| 2017/0102512 A1 | 4/2017 | Yamaoda | |
| 2017/0102513 A1 | 4/2017 | Ogata | |
| 2018/0017785 A1 | 1/2018 | Bulgajewski | |
| 2018/0091775 A1 | 3/2018 | Jung | |
| 2018/0143512 A1 | 5/2018 | Campbell | |
| 2019/0058811 A1* | 2/2019 | Douady-Pleven | H04N 5/23238 |
| 2019/0158709 A1 | 5/2019 | Petty | |
| 2019/0208099 A1 | 7/2019 | Cotoros | |
| 2019/0342473 A1 | 11/2019 | Clearman | |
| 2020/0026023 A1 | 1/2020 | Nagaoka | |
| 2021/0274067 A1 | 9/2021 | Crow | |

OTHER PUBLICATIONS

International Search Report and Written Opinion for App. No. PCT/US2020/042749, dated Apr. 15, 2021, 10 pages.
International Search Report and Written Opinion for App. No. PCT/US2021/024462, dated Jul. 8, 2021, 10 pages.
International Search Report and Written Opinion for App. No. PCT/US2021/037757, dated Oct. 7, 2021, 6 pages.
Miscellaneous Image Transformations, https://docs.opencv.org/2.4/modules/imgproc/doc/miscellaneous_transformations.html#cvtcolor, OpenCV2.4.13.7, retrieved on Aug. 4, 2020, 12 pages.
Scipy.optimize.minimize, https://docs.scipy.org/doc/scipy/reference/generated/scipy.optimize.minimize.html, retrieved on Aug. 4, 2020, 6 pages.
Structural Analysis and Shape Descriptors, https://docs.opencv.org/2.4/modules/imgproc/doc/structural_analysis_and_shape_descriptors.html?highlight=minenclosingcircle#minenclosingcircle, retrieved on Aug. 4, 2020, 27 pages.
Structural Analysis and Shape Descriptors, https://docs.opencv.org/3.4/d3/dc0/group_imgproc_shape.html#ga17ed9f5d79ae97bd4c7cf18403e1689a, OpenCV, retrieved on Aug. 4, 2020, 12 pages.
U.S. Appl. No. 16/803,139, filed Feb. 27, 2020, Crow et al., entitled Heatsink of an Image Capture Device.
Wikipedia, Histogram, https://en.wikipedia.org/wiki/Histogram#Cumulative_histogram, retrieved on Aug. 4, 2020, 7 pages.
Wikipedia, Magic number (programming), https://en.wikipedia.org/wiki/Magic_number_%28programming%29, retrieved on Aug. 4, 2020, 8 pages.
Wikipedia, Median absolute deviation, https://en.wikipedia.org/wiki/Median_absolute_deviation, retrieved on Aug. 4, 2020, 3 pages.
Wikipedia, Random sample consensus, https://en.wikipedia.org/wiki/Random_sample_consensus, retrieved on Aug. 4, 2020, 5 pages.
Wikipedia, YUV, https://en.wikipedia.org/wiki/YUV, retrieved on Aug. 4, 2020, 9 pages.

* cited by examiner

CALIBRATING AN IMAGE CAPTURE
DEVICE WITH A DETACHABLE LENS

CROSS-REFERENCE TO RELATED
APPLICATIONS

This application claims priority to and the benefit of U.S. Provisional Patent Application No. 63/072,508, filed Aug. 31, 2020, the entire disclosure of which is incorporated by reference herein.

TECHNICAL FIELD

This disclosure relates to a method for calibrating an image capture device with a detachable lens.

BACKGROUND

With some image capture devices, an additional (detachable) lens may be mounted on the device to provide additional features beyond those of a built-in (integrated) sensor-lens assembly (ISLA). For example, the detachable lens may provide a wider field of view. When the detachable lens is mounted on the image capture device, the optical center of the full system (image capture device plus mounted detachable lens) may shift. This shift may result in image distortion or "wobble" introduced into an image when image stabilization is performed.

SUMMARY

Disclosed herein are implementations of a method for calibrating an image capture device with a detachable lens.

One aspect of this disclosure is a method. It is determined that a detachable lens is mounted on an image capture device in a first orientation. A first image of a controlled scene is captured with the detachable lens mounted in the first orientation. It is determined that the detachable lens is mounted on the image capture device in a second orientation that is rotated approximately 180 degrees from the first orientation. A second image of the controlled scene is captured with the detachable lens in the second orientation. A first image circle center of the first image is determined. A second image circle center of the second image is determined. An average image circle center is determined, based on the first image circle center and the second image circle center. The average image circle center is provided to an image stabilization algorithm when the detachable lens is mounted on the image capture device.

In aspects, the detachable lens produces an image circle on an image sensor of the image capture device. In aspects, the detachable lens has a symmetrical mechanical mounting on the image capture device. In aspects, the detachable lens is a hemispherical lens. In aspects, the controlled scene is a scene with uniform lighting. In aspects, the controlled scene is a scene of a white background. In aspects, the average image circle center is usable by the image stabilization algorithm regardless of the orientation of the mounted detachable lens. In aspects, the method further includes storing the average image circle center in the image capture device.

Another aspect of this disclosure is a method. It is determined that a detachable lens is mounted on an image capture device in an orientation. An image of a controlled scene is captured with the detachable lens in the orientation. The determining and the capturing are repeated for all possible orientations of the detachable lens on the image capture device. An image circle center is determined for all of the captured images. An average image circle center is determined, based on all of the determined image circle centers. The average image circle center is provided to an image stabilization algorithm when the detachable lens is mounted on the image capture device.

In aspects, the detachable lens produces an image circle on an image sensor of the image capture device. In aspects, the detachable lens has a symmetrical mechanical mounting on the image capture device. In aspects, the detachable lens is a hemispherical lens. In aspects, the controlled scene is a scene with uniform lighting. In aspects, the controlled scene is a scene of a white background. In aspects, the average image circle center is usable by the image stabilization algorithm regardless of the orientation of the mounted detachable lens. In aspects, the method further includes storing the average image circle center in the image capture device.

Another aspect of this disclosure is a non-transitory computer-readable storage medium including processor-executable routines that, when executed by a processor, facilitate a performance of operations, including: receiving a first image of a controlled scene with a detachable lens mounted in a first orientation on an image capture device; receiving a second image of the controlled scene with the detachable lens mounted in a second orientation on the image capture device, the second orientation different from the first orientation; determining a first image circle center of the first image; determining a second image circle center of the second image; determining an average image circle center based on the first image circle center and the second image circle center; and providing the average image circle center to an image stabilization algorithm when the detachable lens is mounted on the image capture device.

In aspects, the detachable lens produces an image circle on an image sensor of the image capture device. In aspects, the detachable lens has a symmetrical mechanical mounting on the image capture device. In aspects, the average image circle center is usable by the image stabilization algorithm regardless of the orientation of the mounted detachable lens.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

With some image capture devices, an additional (detachable) lens may be mounted on the device to provide additional features beyond those of a built-in (integrated) sensor-lens assembly (ISLA). For example, the detachable lens may provide a wider field of view or better image stabilization. If the detachable lens is hemispherical, for example, it may be possible to capture a full panorama image with the image capture device. In this instance, the image stabilization of the image capture device keeps the horizon level to assist in obtaining a smooth panoramic image.

One example of a detachable lens is a hemispherical lens having a wide field of view, which may correspond to an image height of an image sensor of the image capture device. The field of view of the detachable lens may allow for better image stabilization margins than with the ISLA of the image capture device for an identical output field of view. With the increased stabilization margin, the image stabilization algorithm may perform full 360° horizon leveling.

The image stabilization algorithm, and in particular, the image warping used in the image stabilization algorithm, is sensitive to a shift of the optical center. A shift in the optical center can create wobbly images in a stabilized video, for example, since the stabilization algorithm may not be aware of the distortion change. There are three possible sources of shift in the optical center: (1) the active alignment of the ISLA of the image capture device on the image sensor (e.g., the optical axis of the lens of the ISLA has to be aligned with the center of the image sensor), (2) the ISLA mounting on the body of the image capture device and any mechanical defects of a mounting system for the detachable lens, and (3) static tilt of the detachable lens. Even if steps are taken to reduce the amount of optical center shift from these three sources, it may still be possible to have an image capture device with an optical center shift of 50 pixels or more. To know the actual optical center shift of an image capture device, the optical center needs to be calibrated. The calibrated optical center may then be provided as an input to the image stabilization algorithm of the image capture device to obtain better image stabilization.

To achieve image stabilization, the optical center of the full system (the image capture device plus the additional lens) needs to be obtained. Certain image stabilization algorithms are sensitive to displacement of the optical center, and this displacement can cause distortion artifacts in the image (e.g., because the optical center has shifted to the left or to the right). If image warping is performed, and if the optical center of the system does not match the optical center used in the stabilization algorithm, the resulting image may include a "wobble" when the image capture device is moved by a user. To avoid the "wobble" in an image and to obtain the best possible image stabilization, the optical center of the full system needs to be estimated. It is therefore desirable to have a method for calibrating the image capture device with the additional lens attached.

Figure 1A:
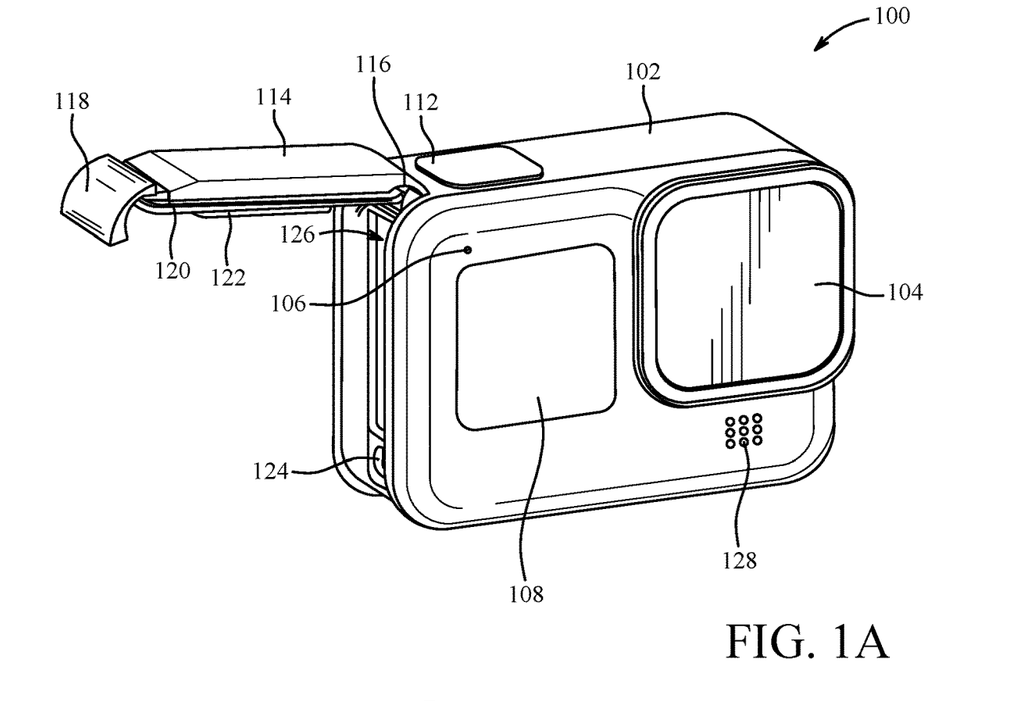
FIGS. 1A-B are isometric views of an example of an image capture device.
Figure 1B:
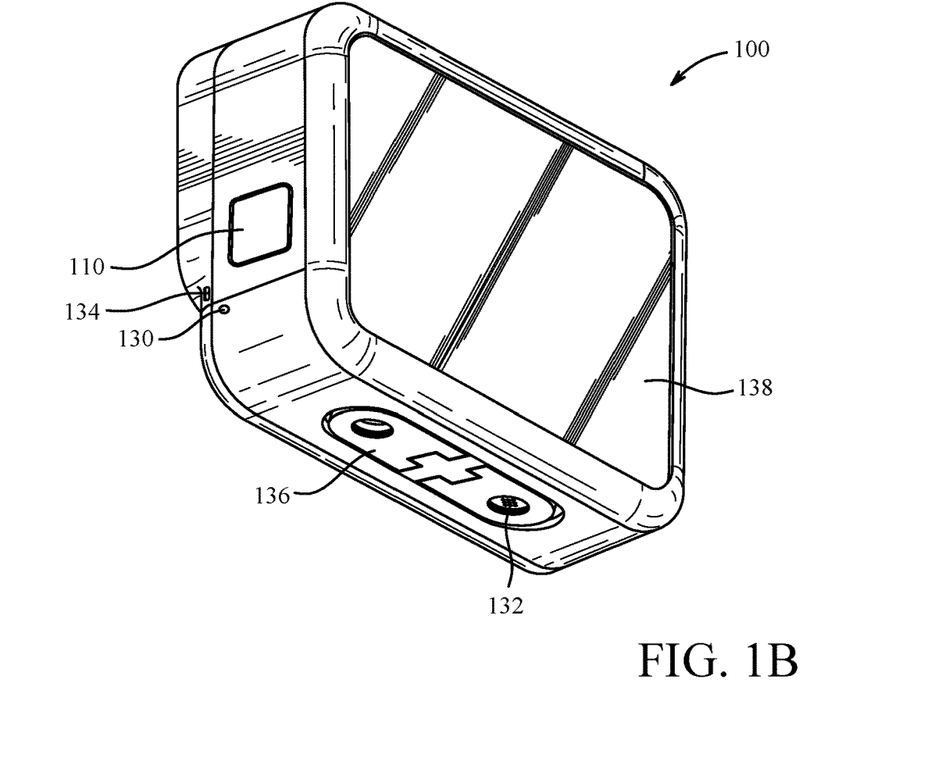

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 6:
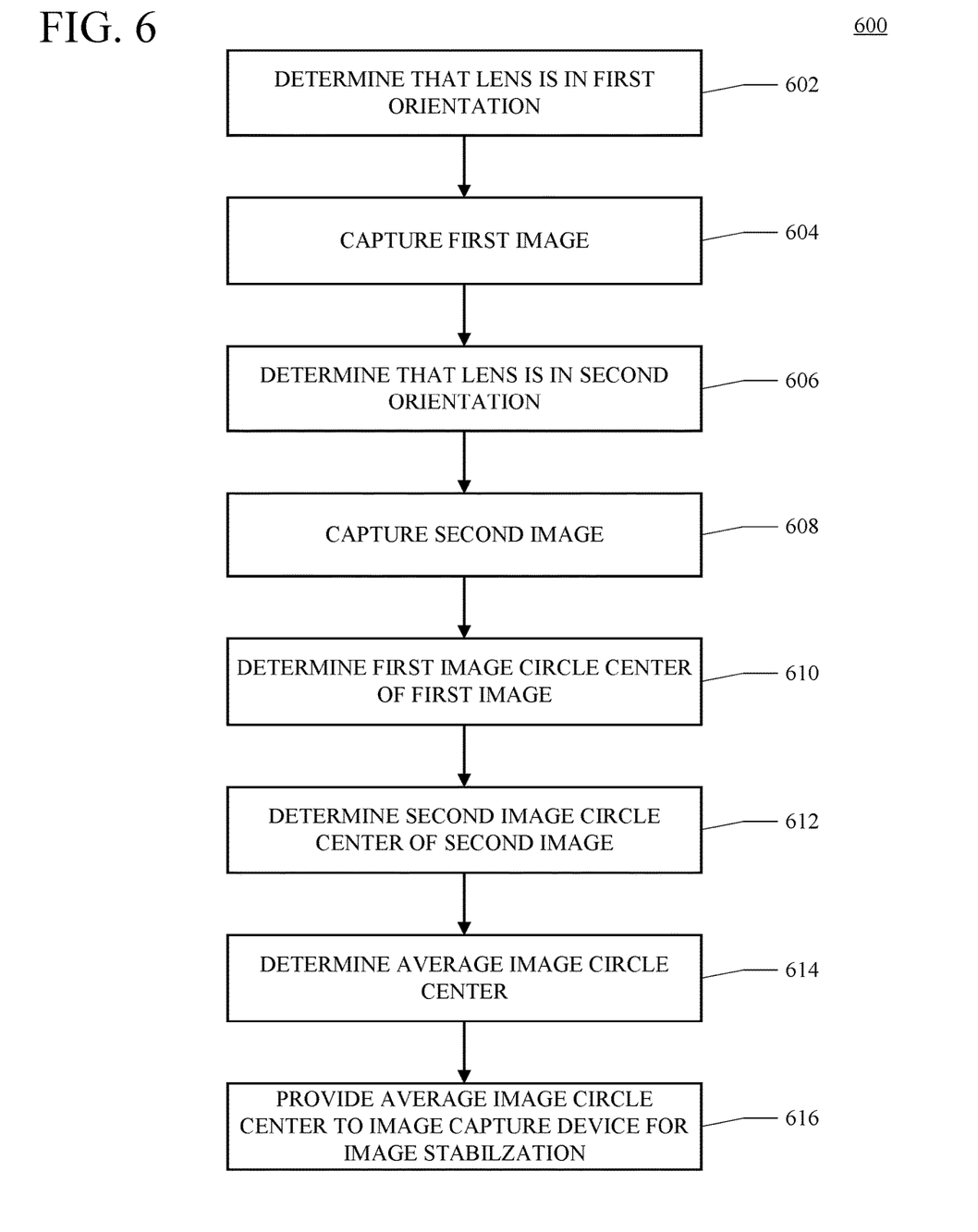
FIG. 6 is a flowchart of a method for calibrating an image capture device with a detachable lens.

The image capture device 100 may be used to implement some or all of the techniques described in this disclosure, such as the method 600 described in FIG. 6.

Figure 2:
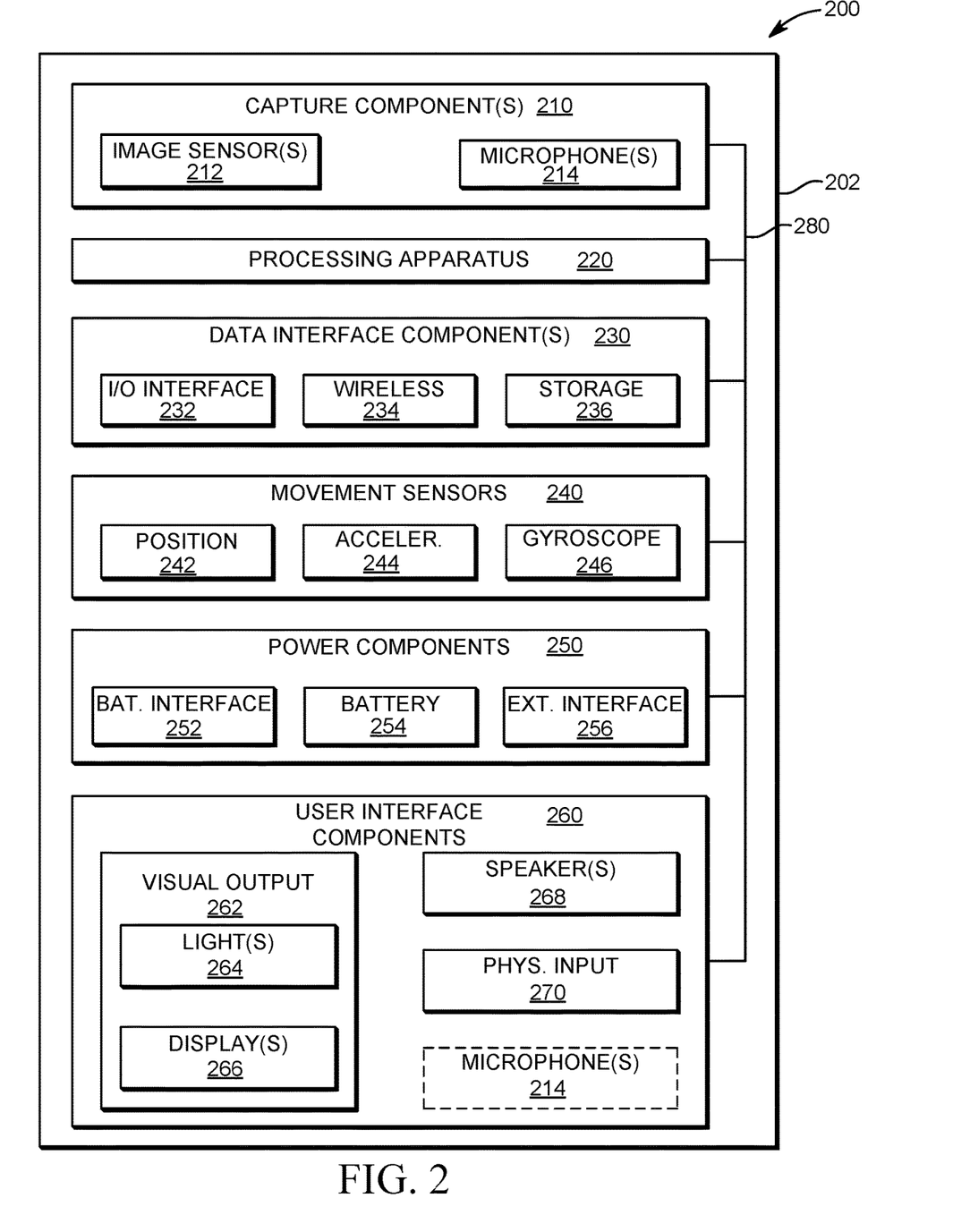
FIG. 2 is a block diagram of electronic components of an image capture device.

FIG. 2 is a block diagram of electronic components in an image capture device 200. The image capture device 200 may be a single-lens image capture device, a multi-lens image capture device, or variations thereof, including an image capture device with multiple capabilities such as use of interchangeable integrated sensor-lens assemblies. The description of the image capture device 200 is also applicable to the image capture devices 100 of FIGS. 1A-B.

The image capture device 200 includes a body 202 which includes electronic components such as capture components 210, a processing apparatus 220, data interface components 230, movement sensors 240, power components 250, and/or user interface components 260.

The capture components 210 include one or more image sensors 212 for capturing images and one or more microphones 214 for capturing audio.

The image sensor(s) 212 is configured to detect light of a certain spectrum (e.g., the visible spectrum or the infrared spectrum) and convey information constituting an image as electrical signals (e.g., analog or digital signals). The image sensor(s) 212 detects light incident through a lens coupled or connected to the body 202. The image sensor(s) 212 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 212 may be passed to other electronic components of the image capture device 200 via a bus 280, such as to the processing apparatus 220. In some implementations, the image sensor(s) 212 includes a digital-to-analog converter. A multi-lens variation of the image capture device 200 can include multiple image sensors 212.

The microphone(s) 214 is configured to detect sound, which may be recorded in conjunction with capturing images to form a video. The microphone(s) 214 may also detect sound in order to receive audible commands to control the image capture device 200.

The processing apparatus 220 may be configured to perform image signal processing (e.g., filtering, tone mapping, stitching, and/or encoding) to generate output images based on image data from the image sensor(s) 212. The processing apparatus 220 may include one or more processors having single or multiple processing cores. In some implementations, the processing apparatus 220 may include an application specific integrated circuit (ASIC). For example, the processing apparatus 220 may include a custom image signal processor. The processing apparatus 220 may exchange data (e.g., image data) with other components of the image capture device 200, such as the image sensor(s) 212, via the bus 280.

The processing apparatus 220 may include memory, such as a random-access memory (RAM) device, flash memory, or another suitable type of storage device, such as a non-transitory computer-readable memory. The memory of the processing apparatus 220 may include executable instructions and data that can be accessed by one or more processors of the processing apparatus 220. For example, the processing apparatus 220 may include one or more dynamic random-access memory (DRAM) modules, such as double data rate synchronous dynamic random-access memory (DDR SDRAM). In some implementations, the processing apparatus 220 may include a digital signal processor (DSP). More than one processing apparatus may also be present or associated with the image capture device 200.

The data interface components 230 enable communication between the image capture device 200 and other electronic devices, such as a remote control, a smartphone, a tablet computer, a laptop computer, a desktop computer, or a storage device. For example, the data interface components 230 may be used to receive commands to operate the image capture device 200, transfer image data to other electronic devices, and/or transfer other signals or information to and from the image capture device 200. The data interface components 230 may be configured for wired and/or wireless communication. For example, the data interface components 230 may include an I/O interface 232 that provides wired communication for the image capture device, which may be a USB interface (e.g., USB type-C), a high-definition multimedia interface (HDMI), or a FireWire interface. The data interface components 230 may include a wireless data interface 234 that provides wireless communication for the image capture device 200, such as a Bluetooth interface, a ZigBee interface, and/or a Wi-Fi interface. The data interface components 230 may include a storage interface 236, such as a memory card slot configured to receive and operatively couple to a storage device (e.g., a memory card) for data transfer with the image capture device 200 (e.g., for storing captured images and/or recorded audio and video).

The movement sensors 240 may detect the position and movement of the image capture device 200. The movement sensors 240 may include a position sensor 242, an accelerometer 244, or a gyroscope 246. The position sensor 242, such as a global positioning system (GPS) sensor, is used to determine a position of the image capture device 200. The accelerometer 244, such as a three-axis accelerometer, measures linear motion (e.g., linear acceleration) of the image capture device 200. The gyroscope 246, such as a three-axis gyroscope, measures rotational motion (e.g., rate of rotation) of the image capture device 200. Other types of movement sensors 240 may also be present or associated with the image capture device 200.

The power components 250 may receive, store, and/or provide power for operating the image capture device 200. The power components 250 may include a battery interface 252 and a battery 254. The battery interface 252 operatively couples to the battery 254, for example, with conductive contacts to transfer power from the battery 254 to the other electronic components of the image capture device 200. The power components 250 may also include an external interface 256, and the power components 250 may, via the external interface 256, receive power from an external source, such as a wall plug or external battery, for operating the image capture device 200 and/or charging the battery 254 of the image capture device 200. In some implementations, the external interface 256 may be the I/O interface 232. In such an implementation, the I/O interface 232 may enable the power components 250 to receive power from an external source over a wired data interface component (e.g., a USB type-C cable).

The user interface components 260 may allow the user to interact with the image capture device 200, for example, providing outputs to the user and receiving inputs from the user. The user interface components 260 may include visual output components 262 to visually communicate information and/or present captured images to the user. The visual output components 262 may include one or more lights 264 and/or more displays 266. The display(s) 266 may be configured as a touch screen that receives inputs from the user. The user interface components 260 may also include one or more speakers 268. The speaker(s) 268 can function as an audio output component that audibly communicates information and/or presents recorded audio to the user. The user interface components 260 may also include one or more physical input interfaces 270 that are physically manipulated by the user to provide input to the image capture device 200. The physical input interfaces 270 may, for example, be configured as buttons, toggles, or switches. The user interface components 260 may also be considered to include the microphone(s) 214, as indicated in dotted line, and the microphone(s) 214 may function to receive audio inputs from the user, such as voice commands.

The image capture device 200 may be used to implement some or all of the techniques described in this disclosure, such as the method 600 described in FIG. 6.

Figure 3A:
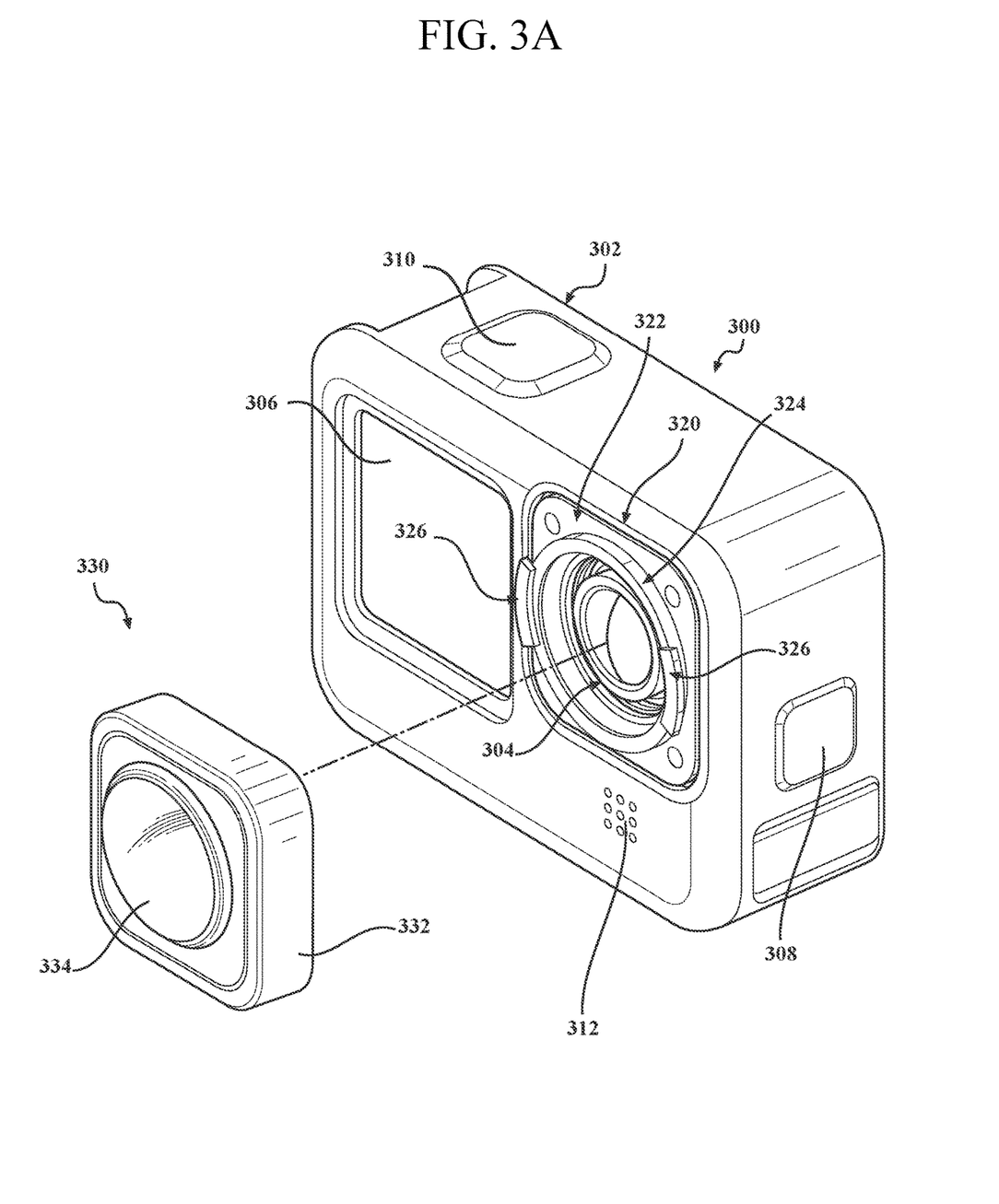
FIGS. 3A-B are isometric views of an example image capture device with a detachable lens.
Figure 3B:
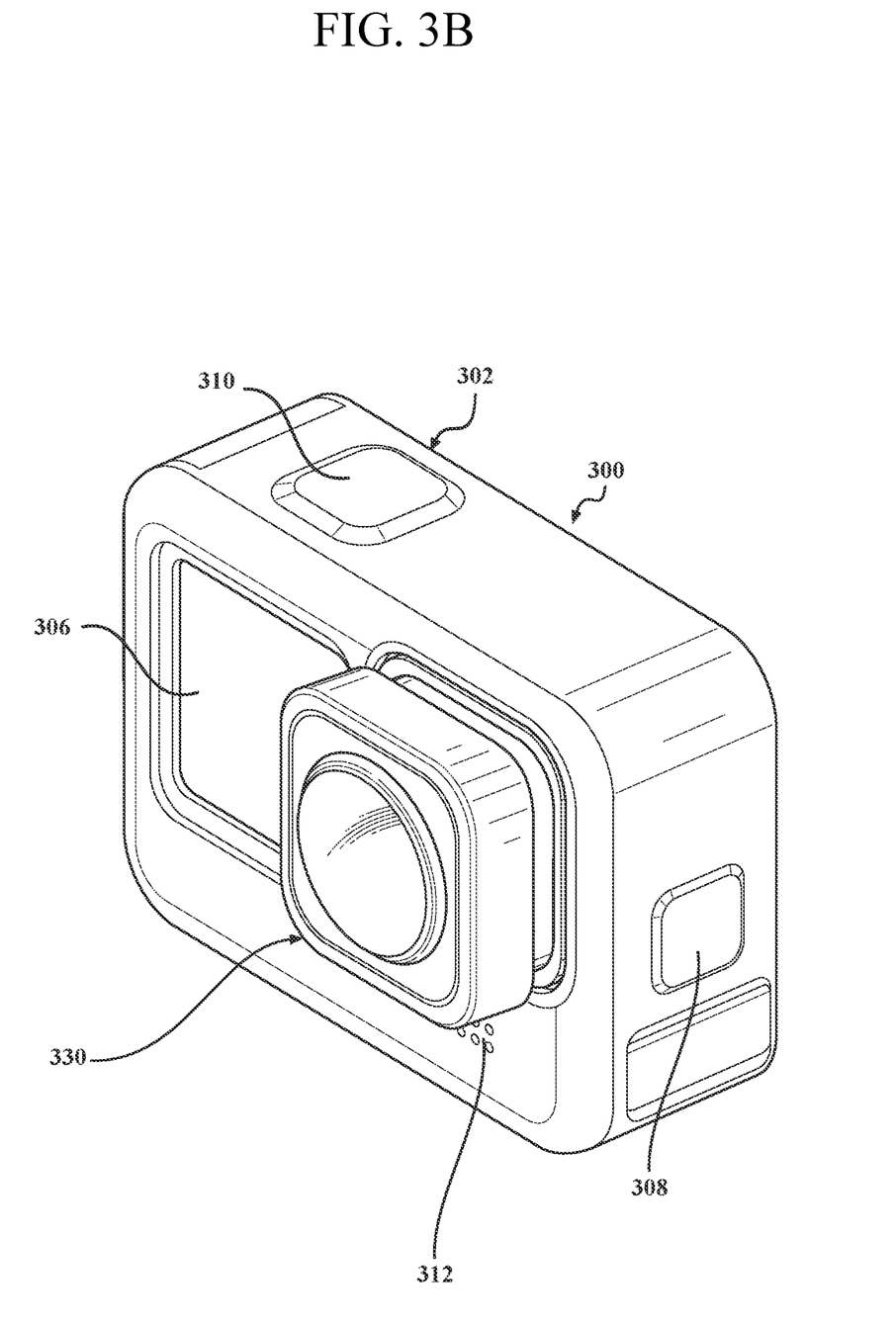

FIGS. 3A-B are isometric views of an example of an image capture device 300 with a detachable lens 330. FIG. 3A shows the image capture device 300 with the detachable lens 330 separated from a body 302 of the image capture device. FIG. 3B shows the image capture device 300 with the detachable lens 330 attached to the body 302 of the image capture device 300. Similar to the image capture device 100, the image capture device 300 may include the body 302, an integrated sensor-lens assembly (ISLA) 304 structured on a front surface of the body 302, various indicators on the front surface of the body 302 (such as light-emitting diodes (LEDs), displays, and the like), various input mechanisms (such as buttons, switches, and/or touchscreens), and electronics (such as imaging electronics, power electronics, etc.) internal to the body 302 for capturing images via the ISLA 304 and/or performing other functions. The ISLA 304 is configured to receive light incident upon the ISLA 304 and to direct received light onto an image sensor internal to the body 302. The image capture device 300 may be configured to capture images and video and to store captured images and video for subsequent display or playback.

The image capture device 300 may include a liquid-crystal display (LCD) or other form of a display 306 to show video, images, and/or status information such as battery life, camera mode, elapsed time, and the like. The image capture device 300 may also include a mode button 308 and a shutter button 310 that are configured to allow a user of the image capture device 300 to interact with the image capture device 300. For example, the mode button 308 and the shutter button 310 may be used to turn the image capture device 300 on and off, scroll through modes and settings, and select modes and change settings. The image capture device 300 may include additional buttons or interfaces (not shown) to support and/or control additional functionality.

The image capture device 300 may include a microphone 312 on a front surface and may include other microphones on other surfaces (not shown). The microphone 312 may be configured to receive and record audio signals in conjunction with recording video or separate from recording of video.

The image capture device 300 may also include additional features not shown in FIG. 3, the additional features being similar to features recited above in connection with FIG. 1. For example, the image capture device 300 may also include an indicator to indicate a status of the image capture device 300 and/or one or more speakers on a surface of the image capture device 300 configured to play back recorded audio or emit sounds associated with notifications.

The image capture device 300 includes a mounting structure 320 configured to receive the detachable lens 330. The mounting structure 320 includes a base 322 attached to the body 302. A front collar 324 extends perpendicularly from the base 322 and is generally annular in configuration. The front collar 324 includes a pair of radial mounting members 326 that are formed integrally with the front collar 324 and are configured for releasable engagement with the detachable lens 330 such that the detachable lens 330 is attachable to and detachable from the image capture device 300 via the mounting structure 320, as described in further detail below.

The detachable lens 330 includes an outer frame 332 surrounding a lens assembly 334. Additional detail on the construction of the detachable lens 330 is provided in connection with FIG. 4.

Figure 4:
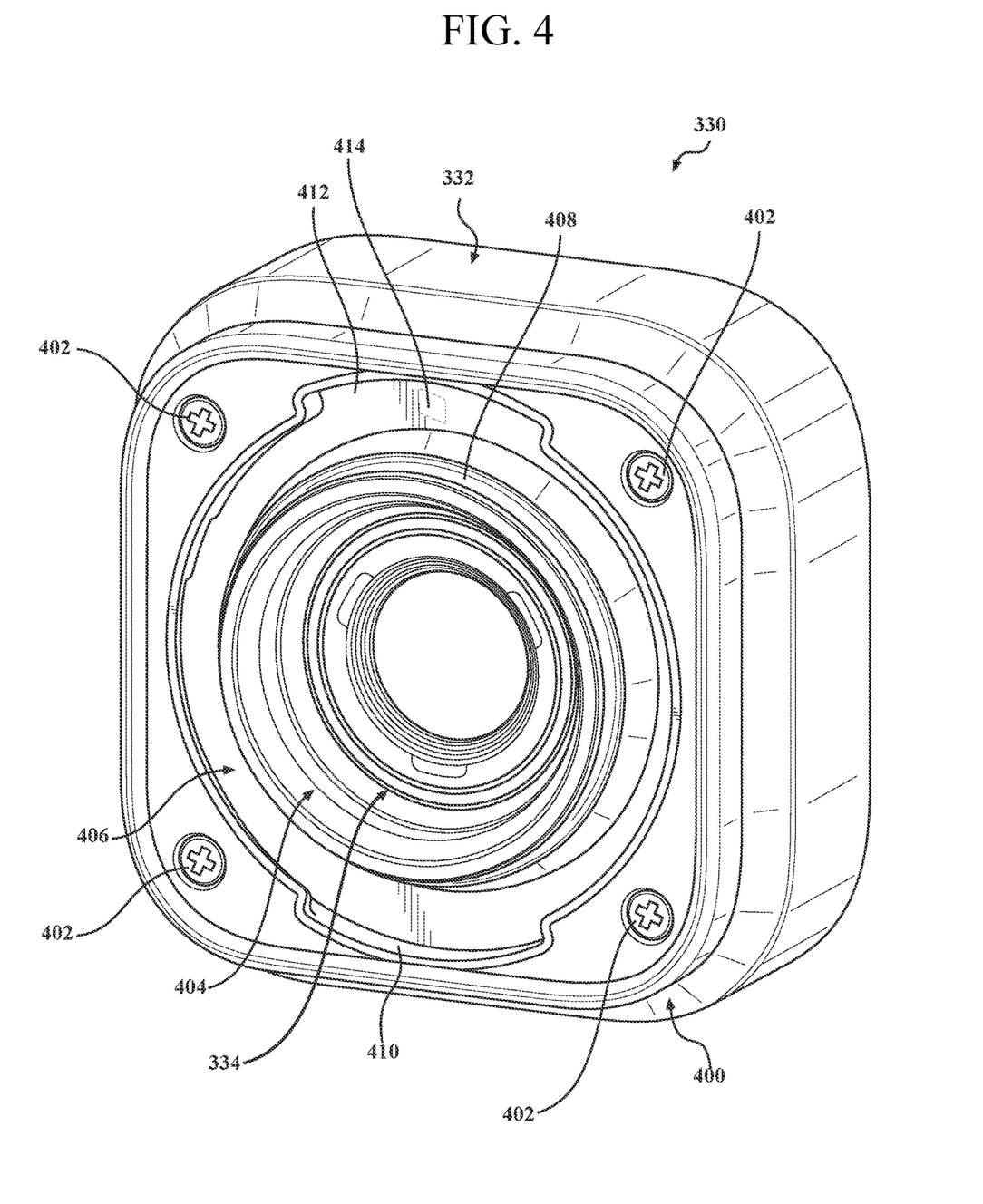
FIG. 4 is an isometric rear view of an example of a detachable lens usable with the image capture device shown in FIGS. 3A-B.

FIG. 4 is an isometric rear view of an example of the detachable lens 330 usable with the image capture device 300 shown in FIGS. 3A-B. A mounting plate 400 is connected to the outer frame 332 by a series of fasteners 402. The lens assembly 334 is secured to the outer frame 332 by an insert 404 and an inner frame 406. A sealing member 408 engages with the front collar 324 of the image capture device 300 (shown in FIG. 3) to create a watertight seal when the detachable lens 330 is attached to the image capture device 300. The mounting plate 400 includes two slots 410, 412 configured in correspondence with the radial mounting members 326 on the mounting structure 320 such that the radial mounting members 326 extend through the slots 410, 412 upon attaching the detachable lens 330 to the image capture device 300.

The mounting plate 400 may also include an orientation indicator 414 positioned in one of the slots 410, 412 (shown in FIG. 4 in slot 412). The orientation indicator 414 is used by a user of the image capture device 300 to determine the orientation of the detachable lens 330 when attached to the image capture device 300. The orientation indicator 414 may be any indicator that is visible to the user of the image capture device 300, and does not interfere with the operation of the detachable lens 330 or the image capture device 300.

Figure 5:
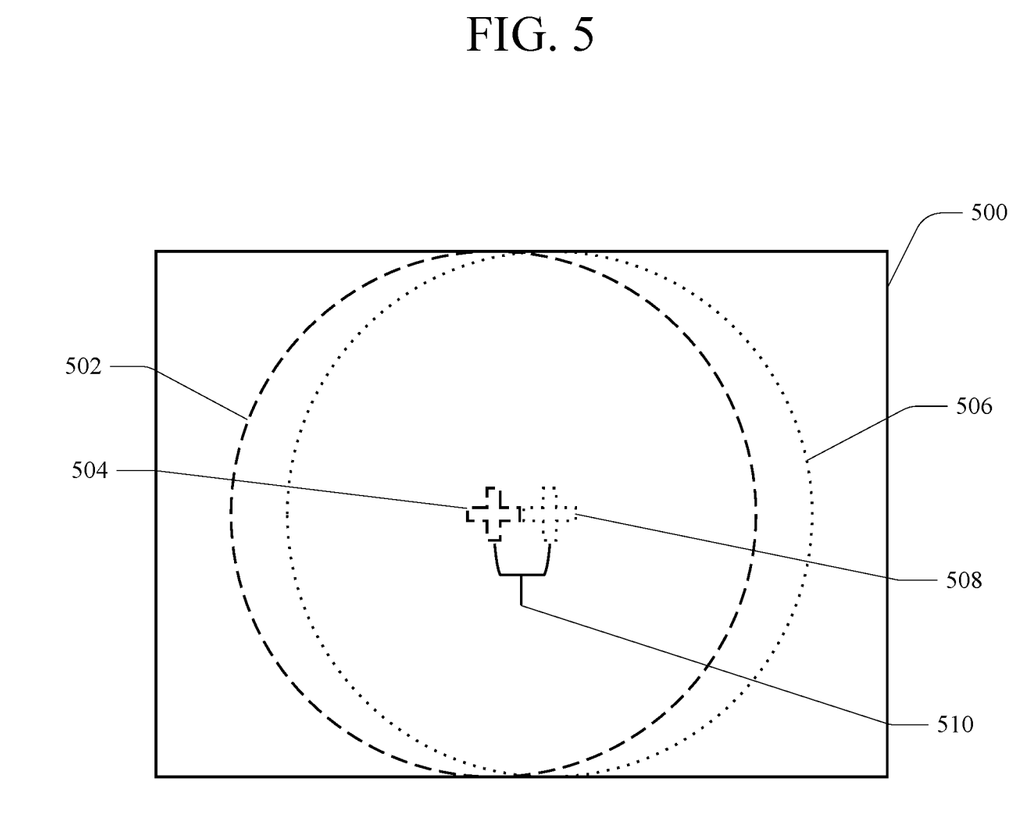
FIG. 5 is a diagram of an example of an image center difference between different mounting orientations of the detachable lens on the image capture device.

FIG. 5 is a diagram of an example of an image center difference between different mounting orientations of a detachable lens on an image capture device, for example, the detachable lens 330 and the image capture device 300 shown in FIGS. 3A to 3B. An image sensor 500 of the image capture device 300 captures a first image 502 when the detachable lens 330 is mounted on the image capture device 300. In FIG. 5, the first image 502 is represented as a circle with a dashed line. When the detachable lens 330 is mounted in a first orientation, the first image 502 has a first image circle center 504 represented as a cross with a dashed line. When the detachable lens 330 is mounted in a second orientation (e.g., rotated by approximately 180 degrees from the first orientation), a second image 506 represented as a circle with a dotted line has a second image circle center 508 represented as a cross with a dotted line. The distance between the two centers 504, 508 is referred to as an excursion 510 of the detachable lens 330. The excursion 510 is expressed in pixels because the positions of the two centers 504, 508 are estimated directly in the images 502, 506. The excursion 510 is on the order of a few pixels, but is generally small enough that the image stabilization algorithm of the image capture device 300 can absorb such a difference. The centers 504, 508 are a representation in the images 502, 506 of the optical axis of the full system (the detachable lens 330 mounted on the image capture device 300).

FIG. 6 is a flowchart of a method 600 for calibrating an image capture device with a detachable lens, for example, the image capture device 300 using the detachable lens 330 shown in FIGS. 3A to 3B. It is determined that the detachable lens 330 is mounted on the image capture device 300 in a first orientation (operation 602). Based on the configuration of the mounting structure 320 of the image capture device 300 and the corresponding slots 410, 412 of the detachable lens 330, it is possible to orient the detachable lens 330 on the image capture device 300 in two different positions rotated approximately 180 degrees from each other. To properly calibrate the image capture device 300, the detachable lens 330 needs to be mounted in both orientations. After calibration, the detachable lens 330 may be mounted on the image capture device 300 in either orientation and the difference between the two orientations is accounted for when the image capture device 300 performs image stabilization.

After it has been determined that the detachable lens 330 is mounted on the image capture device 300 in the first orientation (operation 602), the image capture device 300 captures a first image of a controlled scene (operation 604). As referred to herein, a "controlled scene" is a setting in which there is uniform lighting, for example, lighting via a diffuser or an image taken of a white background.

It is determined that detachable lens 330 is mounted on the image capture device 300 in a second orientation rotated approximately 180 degrees from the first orientation (operation 606). After it has been determined that the detachable lens 330 is mounted on the image capture device 300 in the second orientation (operation 606), the image capture device 300 captures a second image of the controlled scene (operation 608).

A first image circle center 504 of the first image 502 is determined (operation 610), and a second image circle center 508 of the second image 506 is determined (operation 612). It is noted that the first image may instead be the image 506 from FIG. 5 and that the second image may instead be the image 502 from FIG. 5. It is also noted that any suitable algorithm for determining an image circle center may be used in operations 610 and 612. The choice of image circle center determination algorithm does not change the operation of the method 600.

An average image circle center is determined based on the first image circle center 504 and the second image circle center 506 (operation 614), for example, by the following equation:

$$ImageCircleCenter_{Avg} = \frac{ImageCircleCenter_1 + ImageCircleCenter_2}{2} \quad \text{Equation (1)}$$

where $ImageCircleCenter_{Avg}$ is the average image circle center, $ImageCircleCenter_1$ is the first image circle center 504, and $ImageCircleCenter_2$ is the second image circle center 506.

The average image circle center may be stored in the image capture device 300 in a nonvolatile memory. The average image circle center is used as an estimate of the optical center of the full system (image capture device 300 with the detachable lens 330 mounted) to account for cases where the ISLA 304 of the image capture device 300 is not perfectly centered within the mounting structure 320 of the image capture device 300, as misalignment may affect the position of the optical center of the full system. Using the average image circle center also helps to avoid aggregating minor errors in alignment in any of the imaging components (e.g., the ISLA 304 of the image capture device 300, the mounting structure 320 of the image capture device 300, and the detachable lens 330).

The average image circle center is provided to an image stabilization algorithm in the image capture device 300 when the detachable lens 330 is mounted on the image capture device 300 (operation 616). It is noted that in operation 616, because an average image circle center is used by the image stabilization algorithm, the detachable lens 330 may be mounted on the image capture device 300 in either the first orientation or the second orientation, and the image stabilization algorithm will operate correctly.

The image capture device 300 has a single point, a symmetry point, that is independent from the detachable lens and that serves as an axis of radial symmetry. This symmetry point is located close to the average image circle center. The symmetry point (e.g., the barycenter) for each image capture device is located close to the average image circle center. Each different image capture device is separately calibrated because each image capture device has its own symmetry point.

In some embodiments, the method 600 is performed on the production line for each image capture device 300 made. In some embodiments, the method 600 may be performed in the field by a user. This may become necessary in circumstances where the image capture device 300 has been dropped (for example) and the detachable lens 330 is then attached to the image capture device 300. In such embodiments, the user identifies the problem (that the images obtained by the image capture device 300 exhibit distortion artifacts) and performs the calibration. In some embodiments, the image capture device 300 may be configured to automatically detect when images start including distortion artifacts that can be corrected by performing the method 600, and the image capture device 300 then alerts the user to perform the method 600. In some embodiments, it may be possible to perform the method 600 with only one position image, but the detachable lens 330 would need to not exhibit any differences between the different mounting positions. In some embodiments, it may be possible to eliminate operations 602 and 606 from the method 600 without affecting the overall operation of the method 600.

In some embodiments, the mounting structure 320 of the image capture device 300 includes more than two radial mounting members 326. In this configuration, the detachable lens 330 would include a corresponding number of slots (e.g., slots 410, 412) such that the radial mounting members fit into the slots to secure the detachable lens 330 onto the mounting structure 320. In this configuration, the method 600 would be modified to take an image of the controlled scene with the detachable lens 330 in all possible orientations of the detachable lens 330 on the image capture device 300 (e.g., operations 602 and 604 are repeated for all possible orientations of the detachable lens 330 on the image capture device 300).

In some embodiments, a non-transitory computer-readable storage medium includes processor-executable routines that, when executed by a processor, facilitate a performance of the method 600.

This disclosure has used a hemispherical lens as an example of a detachable lens 330 in describing different embodiments. It is noted that the method 600 may also be performed for different types of detachable lenses, as long as the detachable lens 330 has a symmetrical mechanical mounting and produces an image circle on the image sensor of the image capture device 300.

The method 600 is used to calibrate the symmetry point of the image capture device 300, and the calibrated symmetry point is inherent to the particular image capture device 300. By storing the symmetry point (the average image circle center) in the image capture device 300, additional lenses (for example, a wide angle lens, a telephoto lens, or a macro lens) may be attached to the image capture device 300 without having to recalibrate the image capture device 300. In addition, being able to re-use the stored symmetry point benefits a user of the image capture device 300 because recalibrating the image capture device 300 for various lens types would typically include substantial additional processing and may be a complex process that a user might find overly burdensome.

While the method 600 has been described here as being able to provide video stabilization improvements, the benefits of the method 600 may also address vignetting (radial shading). By centering color/luminance shading using the calibrated symmetry center of the image capture device 300, overall image quality may be improved.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   determining that a detachable lens is mounted on an image capture device in a first orientation;
   capturing a first image of a controlled scene with the detachable lens mounted in the first orientation;
   determining that the detachable lens is mounted on the image capture device in a second orientation that is rotated approximately 180 degrees from the first orientation;
   capturing a second image of the controlled scene with the detachable lens in the second orientation;
   determining a first image circle center of the first image;
   determining a second image circle center of the second image;
   determining an average image circle center based on the first image circle center and the second image circle center; and
   providing the average image circle center to an image stabilization algorithm when the detachable lens is mounted on the image capture device.

2. The method of claim 1, wherein the detachable lens produces an image circle on an image sensor of the image capture device.

3. The method of claim 1, wherein the detachable lens has a symmetrical mechanical mounting on the image capture device.

4. The method of claim 1, wherein the detachable lens is a hemispherical lens.

5. The method of claim 1, wherein the controlled scene is a scene with uniform lighting.

6. The method of claim 1, wherein the controlled scene is a scene of a white background.

7. The method of claim 1, wherein the average image circle center is usable by the image stabilization algorithm regardless of the orientation of the mounted detachable lens.

8. The method of claim 1, further comprising:
   storing the average image circle center in the image capture device.

9. A method, comprising:
   determining that a detachable lens is mounted on an image capture device in an orientation;
   capturing an image of a controlled scene with the detachable lens in the orientation;
   repeating the determining and the capturing for all possible rotatable orientations of the detachable lens on the image capture device;
   determining an image circle center for all of the captured images;
   determining an average image circle center based on all of the determined image circle centers; and
   providing the average image circle center to an image stabilization algorithm when the detachable lens is mounted on the image capture device.

10. The method of claim 9, wherein the detachable lens produces an image circle on an image sensor of the image capture device.

11. The method of claim 9, wherein the detachable lens has a symmetrical mechanical mounting on the image capture device.

12. The method of claim 9, wherein the detachable lens is a hemispherical lens.

13. The method of claim 9, wherein the controlled scene is a scene with uniform lighting.

14. The method of claim 9, wherein the controlled scene is a scene of a white background.

15. The method of claim 9, wherein the average image circle center is usable by the image stabilization algorithm regardless of the orientation of the mounted detachable lens.

16. The method of claim 9, further comprising:
    storing the average image circle center in the image capture device.

17. A non-transitory computer-readable storage medium comprising processor-executable routines that, when executed by a processor, facilitate a performance of operations comprising:
    receiving a first image of a controlled scene with a detachable lens mounted in a first orientation on an image capture device;
    receiving a second image of the controlled scene with the detachable lens mounted in a second orientation on the image capture device, the second orientation different from the first orientation;
    determining a first image circle center of the first image;
    determining a second image circle center of the second image;
    determining an average image circle center based on the first image circle center and the second image circle center; and
    providing the average image circle center to an image stabilization algorithm when the detachable lens is mounted on the image capture device.

18. The non-transitory computer-readable storage medium of claim 17, wherein the detachable lens produces an image circle on an image sensor of the image capture device.

19. The non-transitory computer-readable storage medium of claim 17, wherein the detachable lens has a symmetrical mechanical mounting on the image capture device.

20. The non-transitory computer-readable storage medium of claim 17, wherein the average image circle center is usable by the image stabilization algorithm regardless of the orientation of the mounted detachable lens.

\* \* \* \* \*